(12) United States Patent
Vachon

(10) Patent No.: US 12,024,828 B2
(45) Date of Patent: Jul. 2, 2024

(54) ARTIFICIAL TURF SYSTEM PADDING LAYER WITH INTEGRATED GEOFABRIC

(71) Applicant: SafePlay LLC, Cedar Park, TX (US)

(72) Inventor: Frédéric Vachon, Montreal (CA)

(73) Assignee: SafePlay LLC, Cedar Park, TX (US)

( * ) Notice: Subject to any disclaimer, the term of this patent is extended or adjusted under 35 U.S.C. 154(b) by 338 days.

(21) Appl. No.: 17/492,994

(22) Filed: Oct. 4, 2021

(65) Prior Publication Data

US 2022/0106743 A1  Apr. 7, 2022

Related U.S. Application Data

(60) Provisional application No. 63/087,370, filed on Oct. 5, 2020.

(51) Int. Cl.
*E01C 13/08* (2006.01)
*C08L 23/12* (2006.01)

(52) U.S. Cl.
CPC .............. *E01C 13/08* (2013.01); *C08L 23/12* (2013.01); *D10B 2101/12* (2013.01); *D10B 2321/022* (2013.01)

(58) Field of Classification Search
CPC .................................. E01C 13/08; E01C 13/02
See application file for complete search history.

(56) References Cited

U.S. PATENT DOCUMENTS

| | | | |
|---|---|---|---|
| 4,564,310 A * | 1/1986 | Thelen | E01C 13/02 404/31 |
| 6,818,274 B1 * | 11/2004 | Buck | A41G 1/009 428/17 |
| 9,771,692 B2 | 9/2017 | Sawyer et al. | |
| 9,790,646 B2 | 10/2017 | Sawyer et al. | |
| 10,415,192 B2 * | 9/2019 | Wijers | E01C 13/08 |
| 10,982,395 B2 | 4/2021 | Sawyer et al. | |
| 2004/0086664 A1 * | 5/2004 | Seaton | E01C 13/02 428/17 |
| 2012/0258811 A1 * | 10/2012 | Tetrault | C08J 3/24 252/78.3 |
| 2014/0373476 A1 * | 12/2014 | Curtis | B32B 3/26 52/480 |
| 2019/0301107 A1 * | 10/2019 | Aldahir | D04H 1/541 |

FOREIGN PATENT DOCUMENTS

| | | | | |
|---|---|---|---|---|
| CN | 105348638 A | * | 2/2016 | |
| CN | 108530731 A | * | 9/2018 | |
| CN | 108559171 A | * | 9/2018 | ......... B29C 45/0001 |
| GB | 2584628 A | * | 12/2020 | ............ E01C 11/225 |
| KR | 20110116458 A | * | 10/2011 | |
| KR | 20210026805 A | * | 3/2021 | |

\* cited by examiner

*Primary Examiner* — Frederick L Lagman
(74) *Attorney, Agent, or Firm* — Perilla Knox & Hildebrandt LLP; Kenneth A. Knox

(57) ABSTRACT

Various embodiments for a shock pad that may be combined with other similar shock pads to form an elastic sub-layer of an athletic field, or other surface, are disclosed. An artificial turf system may include a synthetic surface and an elastic sub-layer disposed between the synthetic surface and a ground surface. The elastic sub-layer may include a plurality of shock pads configured to retain the synthetic surface and absorb shock. Individual ones of the shock pads may include a top surface connected with the synthetic surface, and a bottom surface facing the ground surface, where a geofabric is affixed to the bottom surface of the individual ones of the pads.

22 Claims, 6 Drawing Sheets

ARTIFICIAL TURF SYSTEM PADDING LAYER WITH INTEGRATED GEOFABRIC

CROSS-REFERENCE TO RELATED APPLICATION

The present disclosure claims the benefit of and priority to U.S. Provisional Application No. 63/087,370 entitled "ARTIFICIAL TURF SYSTEM PADDING LAYER WITH INTEGRATED GEOFABRIC," filed Oct. 5, 2020, the contents of which being incorporated by reference in their entireties herein.

BACKGROUND

Synthetic surfaces, sometimes referred to as synthetic turf or artificial turf, can replace grass to lower maintenance costs associated with playing fields, lawns, playgrounds, and similar areas. Geotextile fabrics, also referred to as geofabrics and filter fabrics, are often installed in artificial turf systems, for instance, to separate a base material from underlying soil. For instance, when installing an artificial turf on a gravel base, an installer may install a geofabric on top of the stone, which separates the soil from the stone, and thereafter install pads. The geofabric prevents the stone and the soil from being mixed, ensuring stability of the artificial turf systems. Geofabrics are often distributed in large rolls that are heavy and cumbersome to manipulate. Also, during installation, geofabrics are difficult to lay in windy, rainy, or other undesirable conditions. The addition to geofabrics in an artificial turf system significantly increase labor costs and thus, are not often employed.

TECHNICAL FIELD

The present disclosure relates to layers for athletic fields and, in particular, describes an artificial turf system pad with an integrated geofabric.

BRIEF SUMMARY OF THE INVENTION

Various embodiments for a shock pad that may be combined with other similar shock pads to form an elastic sub-layer of an athletic field, or other surface, are disclosed. In a first aspect, an artificial turf system is disclosed, including: a synthetic surface; an elastic sub-layer disposed between the synthetic surface and a ground surface, the elastic sub-layer including a plurality of pads configured to retain the synthetic surface and absorb shock, wherein individual ones of the plurality of pads include: a top surface connected with the synthetic surface; and a bottom surface facing the ground surface, the bottom surface of on the individual ones of the plurality of pads having a geofabric affixed thereon.

In some embodiments, the individual ones of the plurality of pads have a pad body including at least one edge, and the geofabric extends past the at least one edge of the pad body. In further embodiments, the individual ones of the plurality of pads have a pad body including at least one edge; the at least one edge is a plurality of edges including a top edge, a bottom edge, a first side edge, and a second side edge opposite that of the first side edge; the geofabric extends to and is substantially flush with the top edge, the bottom edge, and the first side edge; and the geofabric does not extend to the second side edge, wherein at least a portion of the second side edge includes none of the geofabric disposed thereon.

In some embodiments, the geofabric includes at least one of: a plurality of polypropylene fibers and a plurality of active carbon black fibers. In further embodiments, a first one of the plurality of pads has a first pad body including a projecting portion; and a second one of the plurality of pads a second pad body different than that of the first pad body, the second pad body including a recess configured to receive the projecting portion of the first pad body, thereby forming an interference fit between the first one and the second one of the plurality of pads.

In some embodiments, the geofabric on the first one of the plurality of pads has a first configuration; and the geofabric on the second one of the plurality of pads has a second configuration different than that of the first configuration. In some embodiments, the first configuration includes the geofabric of the first one of the plurality of pads being substantially flush with a top edge, a bottom edge, and a first side of a first pad body of the first one of the plurality of pads, wherein at least a portion of the projecting portion does not include any of the geofabric disposed thereon. In some embodiments, the second configuration includes the geofabric of the second one of the plurality of pads being substantially flush with a top edge, a bottom edge, and a first side of a second pad body of the second one of the plurality of pads, wherein the second pad body includes a recess and the geofabric of the second one of the plurality of pads substantially covers the recess. Individual ones of the plurality of pads may be formed of a plurality of discrete beads of a closed cell polypropylene foam material.

In a second aspect, a shock pad for use in an artificial turf system is disclosed, including a top surface configured to couple to a synthetic surface, and a bottom surface facing a ground surface having a geofabric affixed thereon. In some embodiments, the shock pad has a pad body including at least one edge; and the geofabric extends past the at least one edge of the pad body. In further embodiments, the shock pad has a pad body including at least one edge; and the at least one edge is a plurality of edges including a top edge, a bottom edge, a first side edge, and a second side edge opposite that of the first side edge; and the geofabric extends to and is substantially flush with the top edge, the bottom edge, and the first side edge; the geofabric does not extend to the second side edge, where at least a portion of the second side edge includes none of the geofabric disposed thereon.

The geofabric may include at least one of: a plurality of polypropylene fibers and a plurality of active carbon black fibers. In some embodiments, the shock pad has a pad body including a projecting portion configured to be positioned in a recess of an adjacent shock pad, thereby forming an interference fit between the shock pad and the adjacent shock pad. In further embodiments, the shock pad has a pad body including a recess configured to receive a projecting portion of an adjacent shock pad, thereby forming an interference fit between the shock pad and the adjacent shock pad.

In some embodiments, the geofabric on the shock pad has one of a first configuration and a second configuration. The first configuration may include the geofabric of the shock pad being substantially flush with a top edge, a bottom edge, and a first side of a pad body of the shock pad, wherein at least a portion of the projecting portion does not include any of the geofabric disposed thereon. The second configuration may include the geofabric of the shock pad being substantially flush with a top edge, a bottom edge, and a first side of a pad body of the shock pad, wherein the pad body includes a recess and the geofabric of the shock pad substantially covers the recess. The shock pad may be formed of a plurality of discrete beads of a closed cell polypropylene foam material.

In a third aspect, a method is disclosed that includes manufacturing or otherwise providing the artificial turf system described above. In a forth aspect, a method is disclosed that includes manufacturing or otherwise providing the shock pad described above. The method of the third aspect and/or fourth aspect may include affixing the geofabric to the bottom surface of at least one of the plurality of pads during manufacture of the at least one of the plurality of pads, where the geofabric is affixed to the bottom surface of at least one of the plurality of pads during manufacture using at least one adhesive.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
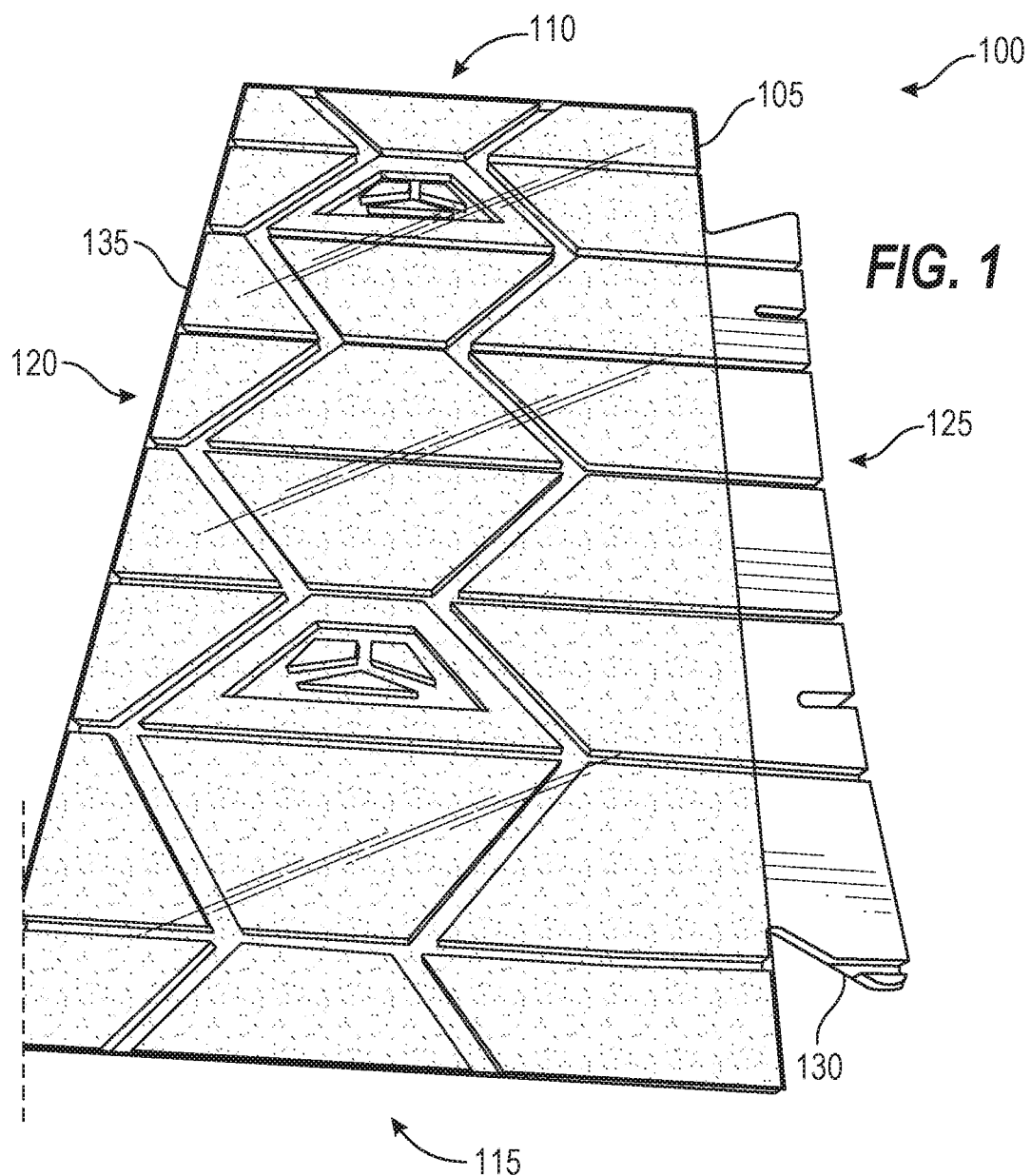
FIG. 1 is a bottom perspective view of a first configuration of shock pad having a geofabric affixed to a bottom surface of the shock pad in accordance with various embodiments described herein.

The present disclosure relates to a shock pad that may be combined with other similar shock pads to form an elastic sub-layer of an athletic field (or other surface). Turning now to FIG. 1, a bottom perspective view of a first configuration of a shock pad 100 is shown in accordance with various embodiments described herein. It is understood that the shock pad 100 may be combined with other similar shock pads 100 to form an elastic sub-layer of an athletic field, or other surface, are disclosed. For instance, multiple ones of the shock pad 100 of FIG. 1 may be combined with multiples one of the shock pad 100 of FIG. 2, as will be described, to form an elastic sub-layer of an athletic field.

The shock pad 100 includes a top surface and a bottom surface, where the bottom surface is shown in FIG. 1. The bottom surface may include the surface that comes into contact with a ground surface, such as a dirt layer, a soil layer, a gravel layer, or other ground surface as may be appreciated. Further, the shock pad 100 includes a pad body 105. In some embodiments, the pad body 105 may be formed of adjacent beads of substantially elastic, resilient closed cell material, such as a polypropylene foam material. The adjacent beads may integrally joined together to form fused beads that act together to absorb impact forces applied to the shock pad 100 or an artificial turf layer disposed thereon.

Further, the pad body 105 includes a top edge 110, a bottom edge 115, a first side edge 120, a second side edge 125 opposite that of the first side edge 120, and a projecting portion 130. As the shock pad 100 of FIG. 1 includes a projecting portion 130, the shock pad 100 of FIG. 1 may be referred to as a male type of shock pad 100 in some implementations. The projecting portion 130 may include a dovetail configuration configured to be positioned in a recess of an adjacent pad, such as a recess of the shock pad 100 of FIG. 2 as will be described. To this end, the projecting portion 130 may include a portion of the pad body 105 extending beyond a rectangular perimeter of the pad body 105 where, in some embodiments, a top of the projecting portion 130 extends at an angle upwards and a bottom of the projecting portion 130 extends at an angle downwards, thereby forming a triangular-shaped projecting portion 130.

A geofabric 135 is affixed to at least a portion of the bottom surface of the shock pad 100, for instance, using an adhesive during manufacture of the shock pad 100. In some embodiments, the geofabric 135 extends to and is substantially flush with the top edge 110, the bottom edge 115, and the first side edge 120. However, as shown in FIG. 1, the geofabric 135 does not extend to (and is not flush with) the second side edge 125. Rather, at least a portion of the second side edge 125 or, more specifically, the projecting portion 130, has none of the geofabric 135 disposed thereon. In some embodiments, the geofabric 135 includes at least one of a plurality of polypropylene fibers and a plurality of active carbon black fibers, although the disclosure is not so limited.

Figure 2:
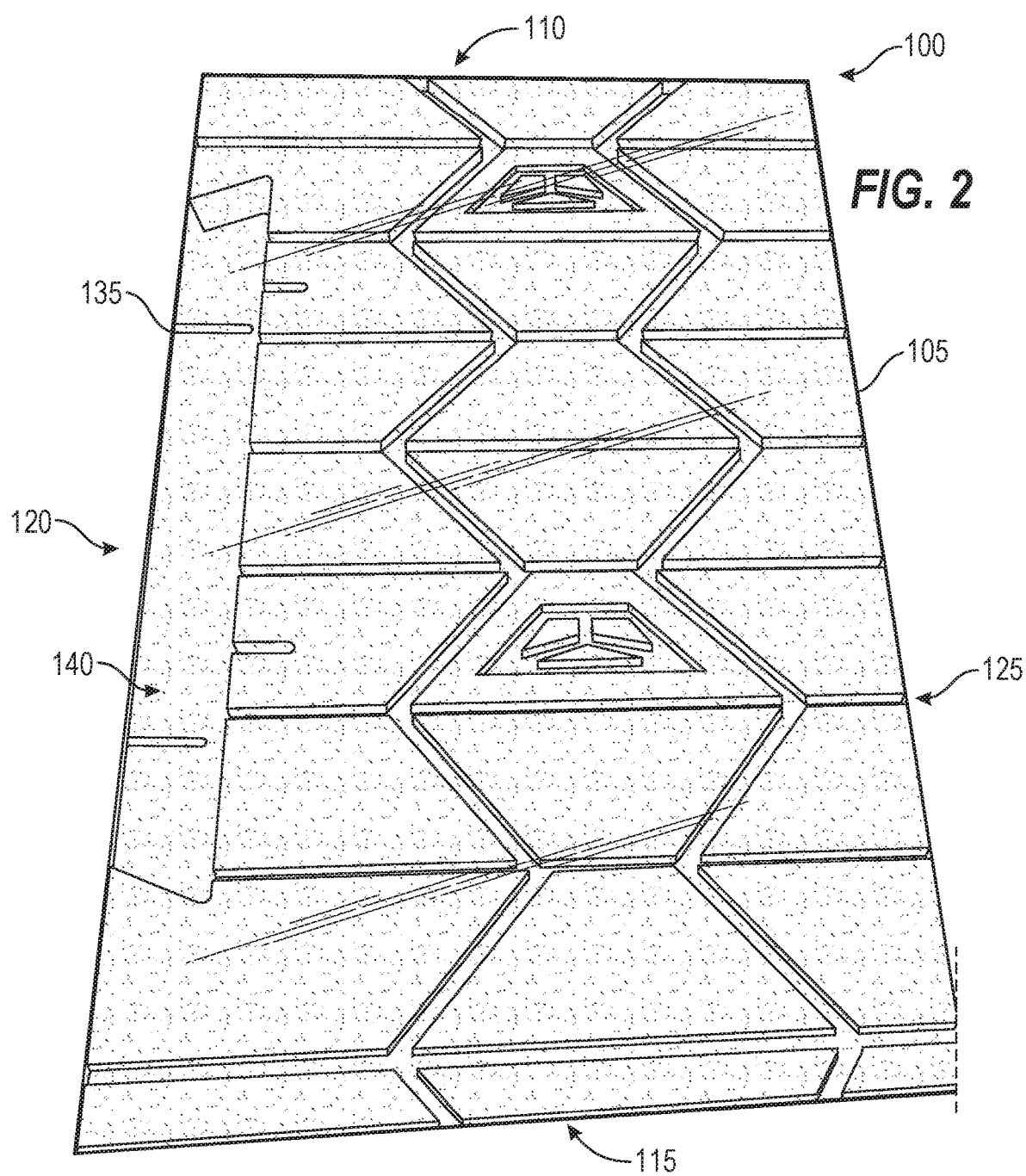
FIG. 2 is a bottom perspective view of a second configuration of shock pad having a geofabric affixed to a bottom surface of the shock pad in accordance with various embodiments described herein.

Referring next to FIG. 2, a bottom perspective view of a second configuration of the shock pad 100 is shown in accordance with various embodiments described herein. It is understood that the shock pad 100 may be combined with other similar shock pads 100 to form an elastic sub-layer of an athletic field, or other surface, are disclosed. For instance, multiple ones of the shock pad 100 of FIG. 2 may be combined with multiples one of the shock pad 100 of FIG. 1, as described above, to form an elastic sub-layer of an athletic field.

Similar to the shock pad 100 of FIG. 1, the shock pad 100 of FIG. 2 includes a top surface and a bottom surface, where the bottom surface is shown in FIG. 2. The shock pad 100 includes a pad body 105. In some embodiments, the pad body 105 may be formed of adjacent beads of substantially elastic, resilient closed cell material, such as a polypropylene foam material. The adjacent beads may integrally joined together to form fused beads that act together to absorb impact forces applied to the shock pad 100 or an artificial turf layer disposed thereon.

Like the configuration of FIG. 1, the pad body 105 includes a top edge 110, a bottom edge 115, a first side edge 120, a second side edge 125 opposite that of the first side edge 120, and a recessed portion 140 (or recess 140). As the shock pad 100 of FIG. 2 includes a recessed portion 140, the shock pad 100 of FIG. 2 may be referred to as a female type of shock pad 100 in some implementations. The recessed portion 140 may include a dovetail configuration configured to receive a projecting portion 130 of an adjacent pad of a similar or substantially similar shape. To this end, the recessed portion 140 may include a notched or non-existing portion of the pad body 105 where, in some embodiments, a top of the recessed portion 140 extends at an angle upwards and a bottom of the recessed portion 140 extends at an angle downwards, thereby forming a triangular-shaped projecting portion 130.

The geofabric 135 is affixed to at least a portion of the bottom surface of the shock pad 100, for instance, using an adhesive during manufacture of the shock pad 100. In some embodiments, the geofabric 135 is positioned such that the geofabric 135 is substantially flush with the top edge 110, the bottom edge 115, and the second side 125 of the pad body 105. The geofabric 135 may substantially cover the recessed portion 140. The shock pad 100 may be formed of a plurality of discrete beads of a closed cell polypropylene foam material.

The shock pad 100 of FIG. 1 and/or FIG. 2 may include a plurality of channels positioned on a bottom surface of the shock pads 100 that allow for water drainage and flexing of the shock pads 100 upon downward forces. Additionally, the shock pads 100 may include drainage holes that align or do not align with the drainage channels. A top surface of the shock pad 100 may include upward facing projections configured to come into contact and retain an athletic field layer, which may include a top layer made of substantially artificial material simulating a natural playing surface, such as grass.

Figure 3:
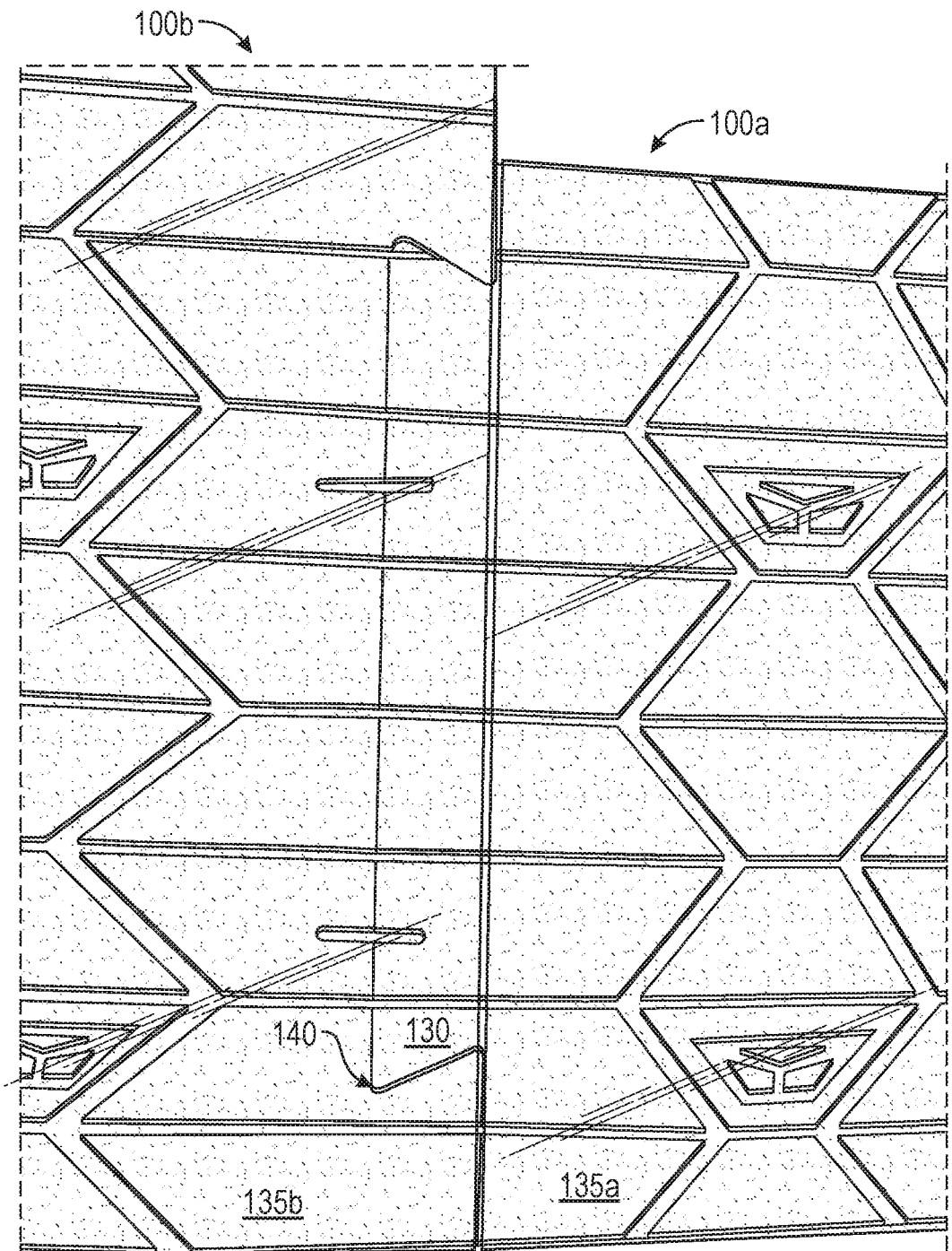
FIG. 3 is a bottom perspective view of the shock pads of FIGS. 1 and 2, each having a geofabric affixed to a respective bottom surface in accordance with various embodiments described herein.

Moving along to FIG. 3, a bottom perspective view of the shock pad 100a of FIG. 1 is shown as being coupled to the shock pad 100b of FIG. 2 in accordance with various embodiments described herein. As shown in FIG. 3, each of the shock pads 100a, 100b has a geofabric 135a, 135b affixed to a respective bottom surface. The male shock pad 100a has its projecting portion 130 received and nested in the recessed portion 140 of the female shock pad 100b such that the first shock pad 100a is coupled to the second shock pad 100b (also referred to as an adjacent shock pad 100, or vice versa) through an interference and/or friction fit. Notably, the geofabric 135a of the first shock pad 100a is distinct and separate from the geofabric 135b of the second shock pad 100b. However, when the first shock pad 100a and the second shock pad 100b are coupled, a substantially continuous and gapless geofabric layer is formed.

Figure 4:
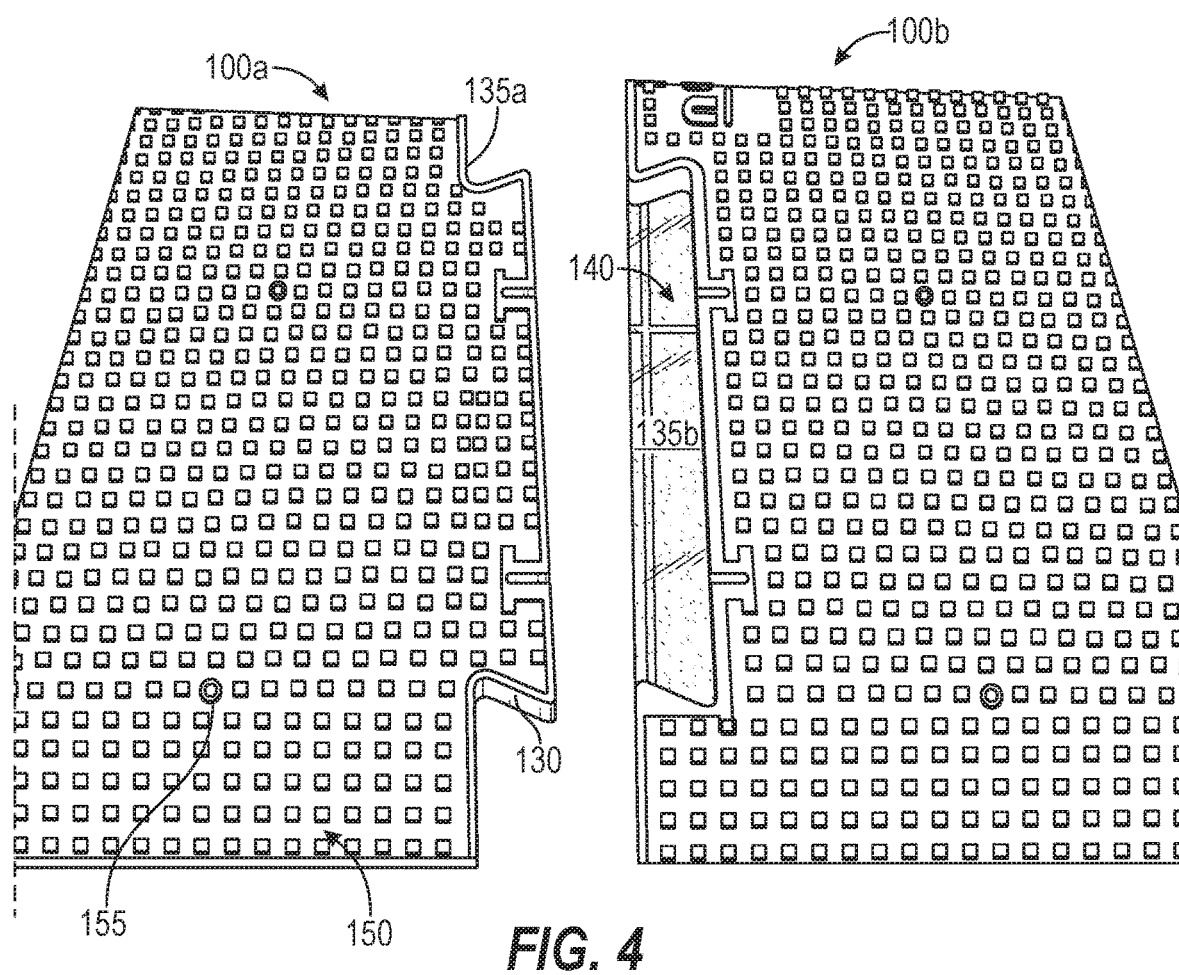
FIG. 4 is a top perspective view of the shock pads of FIGS. 1 and 2, each having a geofabric affixed to a respective bottom surface in accordance with various embodiments described herein.

Referring next to FIG. 4, a top perspective view of the shock pad 100a of FIG. 1 is shown as being coupled to the shock pad 100b of FIG. 2 in accordance with various embodiments described herein. As shown in FIG. 4, each of the shock pads 100a, 100b has a geofabric 135a, 135b affixed to a respective bottom surface. While shown as being separated, the male shock pad 100a has a projecting portion 130 configured to be received and nested in the recessed portion 140 of the female shock pad 100b such that the first shock pad 100a is coupled to the second shock pad 100b (also referred to as an adjacent shock pad 100, or vice versa). Notably, the geofabric 135a of the first shock pad 100a is distinct and separate from the geofabric 135b of the second shock pad 100b. However, when the first shock pad 100a and the second shock pad 100b are coupled, a substantially continuous and gapless geofabric layer is formed. For instance, when the shock pads 100a, 100b are coupled the projecting portion 130 (having no geofabric 130a formed thereon) overlaps the geofabric 130b of the second shock pad 100b (e.g., the adjacent shock pad 100).

Further, the top surface of the shock pads 100a, 100b are shown having upward facing projections 150 configured to come into contact and retain an athletic field layer, which may include a top layer made of substantially artificial material simulating a natural playing surface, such as grass. Drainage holes 155 are shown which may be nested within projections such that drainage only occurs when water has risen above a threshold level (e.g., thereby retaining water in water accumulation regions for cooling).

Figure 5:
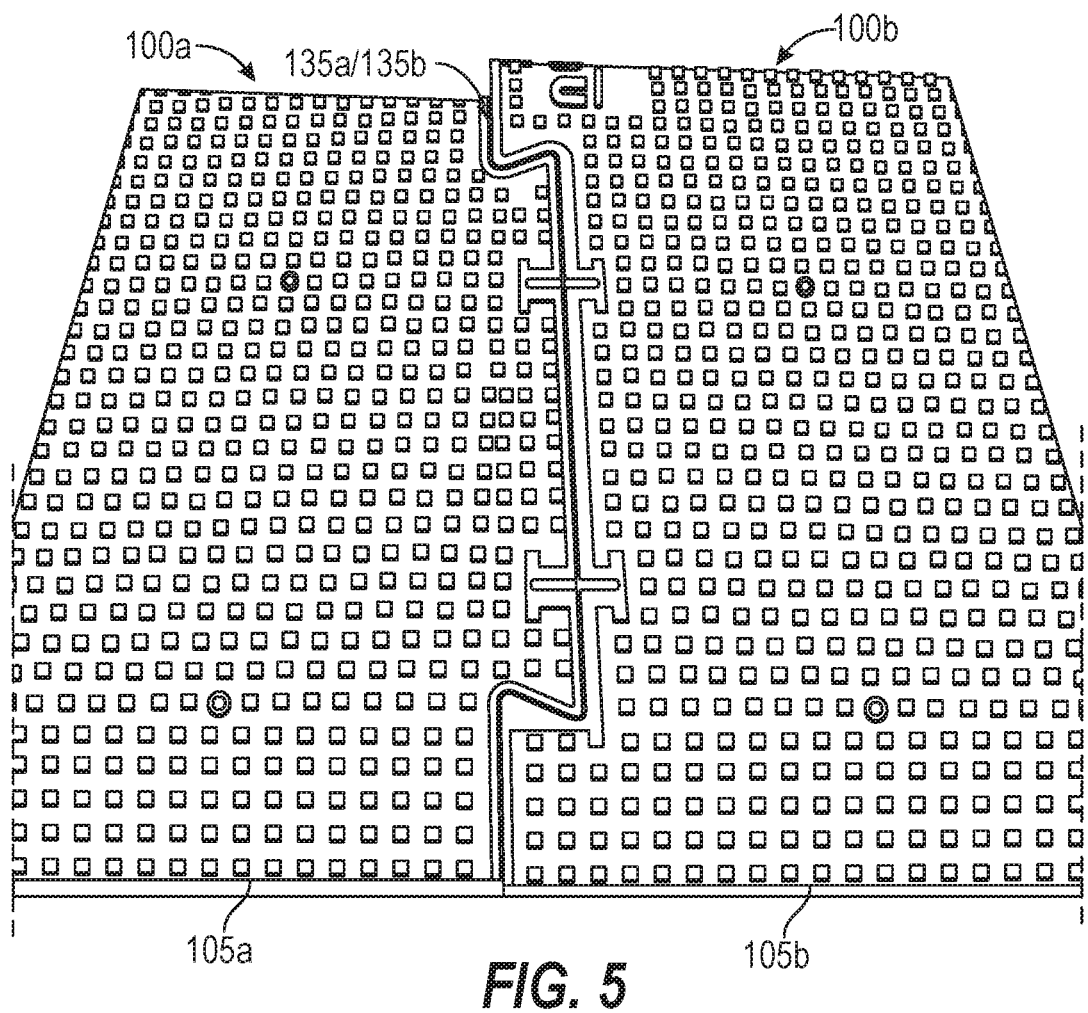
FIG. 5 is a top perspective view of the shock pads of FIGS. 1 and 2, each having a geofabric affixed to a respective bottom surface in accordance with various embodiments described herein.

Turning now to FIG. 5, another top perspective view of the shock pad 100a of FIG. 1 is shown as being coupled to the shock pad 100b of FIG. 2 in accordance with various embodiments described herein. As shown in FIG. 5, each of the shock pads 100a, 100b has a geofabric 135a, 135b affixed to a respective bottom surface. The male shock pad 100a has its projecting portion 130 received and nested in the recessed portion 140 of the female shock pad 100b such that the first shock pad 100a is coupled to the second shock pad 100b (also referred to as an adjacent shock pad 100, or vice versa). Notably, the geofabric 135a of the first shock pad 100a is distinct and separate from the geofabric 135b of the second shock pad 100b. However, when the first shock pad 100a and the second shock pad 100b are coupled, a substantially continuous and gapless geofabric layer is formed. For instance, when the shock pads 100a, 100b are coupled the projecting portion 130 (having no geofabric 130a formed thereon) overlaps the geofabric 130b of the second shock pad 100b (e.g., the adjacent shock pad 100).

In further embodiments, an artificial turf system is disclosed that includes a synthetic surface, an elastic sub-layer disposed between the synthetic surface and a ground surface, and a geofabric layer. The elastic sub-layer may include one or more of the shock pads 100 described herein, which are configured to retain the synthetic surface and absorb shock. The shock pads 100 may include a top surface connected with the synthetic surface through a direct or indirect connection, and a bottom surface facing the ground surface. The bottom surface of the individual ones of the shock pads 100 having a geofabric affixed thereon that, when connected, form the geofabric layer.

In some embodiments, the shock pads 100 have a pad body 105 including at least one edge, and the geofabric 135 extends past the at least one edge of the pad body 105. In further embodiments, the individual ones of the shock pads 100 have a pad body 105 including a plurality of edges, such as a top edge 110, a bottom edge 115, a first side edge 120, and a second side edge 125 opposite that of the first side edge 120. The geofabric 135 extends to and is substantially flush with the top edge 110, the bottom edge 115, and the first side edge 120. The geofabric does not extend to the second side edge 125, where at least a portion of the second side edge 125 includes none of the geofabric 135 disposed thereon.

In further embodiments, a first one of the shock pads 100a has a first pad body 105a including a projecting portion 130. A second one of the shock pads 100b has a second pad body 105b different than that of the first pad body 105a. The second pad body 105b includes a recessed portion 140 configured to receive the projecting portion 130 of the first pad body 105a, thereby forming an interference fit between the first one and the second one of the shock pads 100a, 100b.

As described above, in some embodiments, the geofabric 135a on the first shock pad 100a has a first configuration shown and described in FIG. 1, and the geofabric 135b on the shock pad 100b has a second configuration different than that of the first configuration. In some embodiments, the first configuration includes the geofabric 135a of the first shock pad 100a being substantially flush with a top edge 110, a bottom edge 115, and a first side 120 of a first pad body 105a of the first shock pad 100a, where at least a portion of the projecting portion 130 does not include any of the geofabric disposed thereon. In some embodiments, the second configuration includes the geofabric 135*b* of the second shock pad 100*b* being substantially flush with a top edge 110, a bottom edge 115, and a first side 120 of a second pad body 105*b* of the second shock pad 100*b*, where the second pad body 105*b* includes a recessed portion 140 and the geofabric 135*b* of the second shock pad 100*b* substantially covers the recessed portion 140.

According to various embodiments, a method is disclosed that includes manufacturing or otherwise providing the shock pad(s) 100 described above as well as an artificial turf system. The method may include affixing the geofabric 135 to the bottom surface of at least one of the shock pads 100 during manufacture of the at least one of the shock pads 100, where the geofabric 135 is affixed to the bottom surface of the at least one of the shock pads 100 during manufacture using at least one adhesive.

Figure 6:
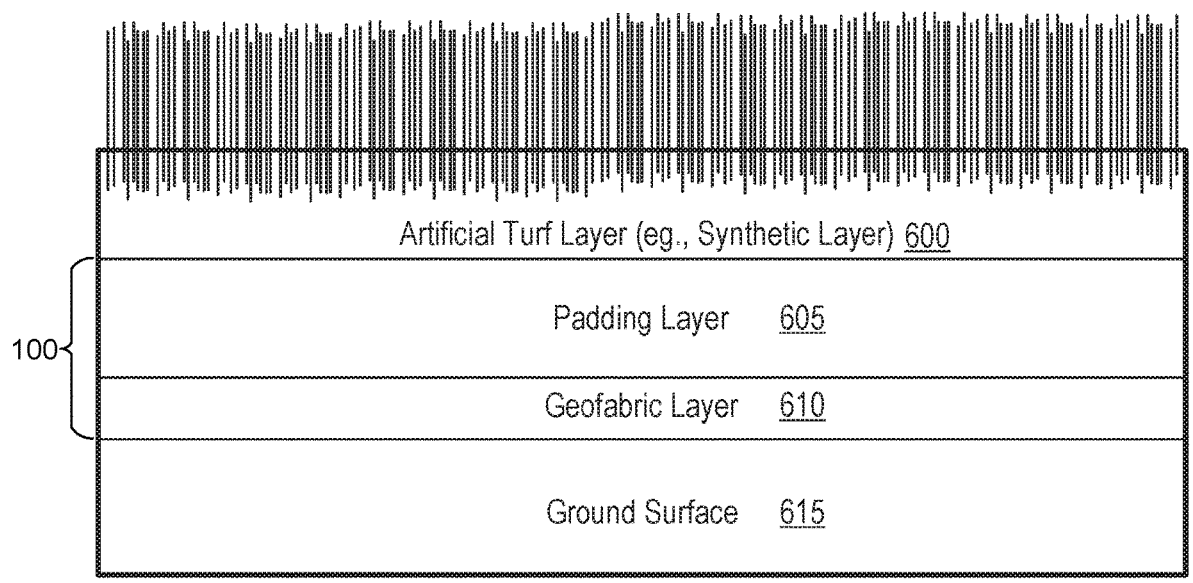
FIG. 6 is a schematic diagram of an artificial turf system having a padding layer with an integrated geofabric in accordance with various embodiments described herein.

FIG. 6 is a schematic diagram showing an artificial turf layer 600 comprising synthetic fibers, such as synthetic grass fibers that emulate grass. The artificial turf layer 600 may further include infill, such as sand, rubber, or other infill material. The padding layer 605 may be disposed below the artificial turf layer 600, and may be formed by one or more of the shock pads 100 described herein. The shock pads 100 include geofabric 135 that, when the shock pads 100 are combined, formed the geofabric layer 610 which is positioned below the padding layer 605 and the ground surface 615.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y.'"

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by supported claims.

Therefore, the following is claimed:

1. An artificial turf system, comprising:
   a synthetic surface;
   an elastic sub-layer disposed between the synthetic surface and a ground surface, the elastic sub-layer comprising a plurality of pads configured to retain the synthetic surface and absorb shock, wherein individual ones of the plurality of pads comprise:
      a top surface connected with the synthetic surface; and
      a bottom surface facing the ground surface, the bottom surface of the individual ones of the plurality of pads having a geofabric affixed thereon,
      wherein the individual ones of the plurality of pads have a pad body comprising at least one edge, and wherein the geofabric extends past the at least one edge of the pad body.

2. The system of claim 1, wherein the geofabric comprises at least one of:
   a plurality of polypropylene fibers and a plurality of active carbon black fibers.

3. The system of claim 1, wherein:
   a first one of the plurality of pads has a first pad body comprising a projecting portion; and
   a second one of the plurality of pads a second pad body different than that of the first pad body, the second pad body comprising a recess configured to receive the projecting portion of the first pad body, thereby forming an interference fit between the first one and the second one of the plurality of pads.

4. The system of claim 3, wherein:
   the geofabric on the first one of the plurality of pads has a first configuration; and
   the geofabric on the second one of the plurality of pads has a second configuration different than that of the first configuration.

5. The system of claim 4, wherein the first configuration comprises the geofabric of the first one of the plurality of pads being substantially flush with a top edge, a bottom edge, and a first side of a first pad body of the first one of the plurality of pads, wherein at least a portion of the projecting portion does not comprise any of the geofabric disposed thereon.

6. The system of claim 5, wherein the second configuration comprises the geofabric of the second one of the plurality of pads being substantially flush with a top edge, a bottom edge, and a first side of a second pad body of the second one of the plurality of pads, wherein the second pad body comprises a recessed portion and the geofabric of the second one of the plurality of pads substantially covers the recessed portion.

7. The system of claim 1, wherein individual ones of the plurality of pads are formed of a plurality of discrete beads of a closed cell polypropylene foam material.

8. A shock pad for use in an artificial turf system, comprising a top surface configured to couple to a synthetic surface, and a bottom surface for facing a ground surface, the bottom surface having a geofabric affixed thereon, wherein
   the shock pad has a pad body comprising at least one edge; and
   the geofabric extends past the at least one edge of the pad body.

9. The shock pad of claim 8, wherein the geofabric comprises at least one of: a plurality of polypropylene fibers and a plurality of active carbon black fibers.

10. The shock pad of claim 8, wherein the shock pad has a pad body comprising a recess configured to receive a projecting portion of an adjacent shock pad, thereby forming an interference fit between the shock pad and the adjacent shock pad.

11. The shock pad of claim 8, wherein the shock pad is formed of a plurality of discrete beads of a closed cell polypropylene foam material.

12. An artificial turf system, comprising: a synthetic surface; an elastic sub-layer disposed between the synthetic surface and a ground surface, the elastic sub-layer comprising a plurality of pads configured to retain the synthetic surface and absorb shock, wherein individual ones of the plurality of pads comprise: a top surface connected with the synthetic surface; and a bottom surface facing the ground surface, the bottom surface of the individual ones of the plurality of pads having a geofabric affixed thereon; wherein the individual ones of the plurality of pads have a pad body comprising at least one edge; the at least one edge is a plurality of edges comprising a top edge, a bottom edge, a first side edge, and a second side edge opposite that of the first side edge; the geofabric extends to and is substantially flush with the top edge, the bottom edge, and the first side edge; and the geofabric does not extend to the second side edge, wherein at least a portion of the second side edge comprises none of the geofabric disposed thereon.

13. The system of claim 12, wherein the geofabric comprises at least one of: a plurality of polypropylene fibers and a plurality of active carbon black fibers.

14. The shock pad of claim 13, wherein the shock pad has a pad body comprising a recess configured to receive a projecting portion of an adjacent shock pad, thereby forming an interference fit between the shock pad and the adjacent shock pad.

15. The system of claim 13, wherein the geofabric comprises at least one of: a plurality of polypropylene fibers and a plurality of active carbon black fibers.

16. The shock pad of claim 13, wherein the shock pad is formed of a plurality of discrete beads of a closed cell polypropylene foam material.

17. A shock pad for use in an artificial turf system, comprising a top surface configured to couple to a synthetic surface, and a bottom surface for facing a ground surface, the bottom surface having a geofabric affixed thereon, wherein:

the shock pad has a pad body comprising at least one edge; and the at least one edge is a plurality of edges comprising a top edge, a bottom edge, a first side edge, and a second side edge opposite that of the first side edge; and the geofabric extends to and is substantially flush with the top edge, the bottom edge, and the first side edge;

the geofabric does not extend to the second side edge, wherein at least a portion of the second side edge comprises none of the geofabric disposed thereon.

18. The shock pad of claim 17, wherein the shock pad has a pad body comprising a projecting portion configured to be positioned in a recess of an adjacent shock pad, thereby forming an interference fit between the shock pad and the adjacent shock pad.

19. The shock pad of claim 18, wherein:

the geofabric on the shock pad has one of a first configuration and a second configuration;

the first configuration comprises the geofabric of the shock pad being substantially flush with a top edge, a bottom edge, and a first side of a pad body of the shock pad, wherein at least a portion of the projecting portion does not comprise any of the geofabric disposed thereon; and the second configuration comprises the geofabric of the shock pad being substantially flush with a top edge, a bottom edge, and a first side of a pad body of the shock pad, wherein the pad body comprises a recess and the geofabric of the shock pad substantially covers the recess.

20. The shock pad of claim 17, wherein the shock pad has a pad body comprising a recess configured to receive a projecting portion of an adjacent shock pad, thereby forming an interference fit between the shock pad and the adjacent shock pad.

21. The system of claim 17, wherein the geofabric comprises at least one of: a plurality of polypropylene fibers and a plurality of active carbon black fibers.

22. The shock pad of claim 17, wherein the shock pad is formed of a plurality of discrete beads of a closed cell polypropylene foam material.

\* \* \* \* \*